United States Patent
Kim

(10) Patent No.: US 7,289,398 B2
(45) Date of Patent: Oct. 30, 2007

(54) OPTICAL DISK APPARATUS AND METHOD FOR TRACKING THEREOF

(75) Inventor: Eung-Sun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 10/985,895

(22) Filed: Nov. 12, 2004

(65) Prior Publication Data

US 2006/0104163 A1 May 18, 2006

(51) Int. Cl.
*G11B 7/00* (2006.01)

(52) U.S. Cl. .............................. 369/44.27; 369/44.28; 369/53.23; 369/53.41

(58) Field of Classification Search ...................... None
See application file for complete search history.

(56) References Cited

U.S. PATENT DOCUMENTS

| 6,504,802 | B1 * | 1/2003 | Tsukahara et al. | 369/44.35 |
| 2006/0193218 | A1 * | 8/2006 | Kuo | 369/44.25 |

FOREIGN PATENT DOCUMENTS

| JP | 07-240028 | 9/1995 |
| JP | 08-087760 | 4/1996 |
| JP | 2002-032912 | 1/2002 |
| JP | 2002-279656 | 9/2002 |

\* cited by examiner

*Primary Examiner*—Muhammad Edun
(74) *Attorney, Agent, or Firm*—Roylance, Abrams, Berdo & Goodman, L.L.P.

(57) ABSTRACT

An optical disk apparatus and method having a pick-up part for emitting a light onto a recording surface of an optical disk and receiving the light reflected from the recording surface of optical disk and a driving part for controlling the pick-up part. The apparatus and method comprise an error detection part for detecting a tracking error based on a distribution of the received and reflected light, when the pick-up part traces vertical movement of the optical-disk according to control of the driving part; a capacity calculation part for calculating capacity of an optical-disk corresponding to the calculated tracking error size; and a tracking control part for resetting a control method of the driving part for the pick-up part to trace a track of the optical-disk based on the calculated capacity. As such, the track of an optical disk may be minutely traced.

13 Claims, 5 Drawing Sheets

OPTICAL DISK APPARATUS AND METHOD FOR TRACKING THEREOF

BACKGROUND OF THE INVENTION

1. Field of the Invention

The present invention relates to an optical disk apparatus and method for tracking thereof. More particularly, the present invention relates to an optical disk apparatus and method for tracking thereof which can optimize the tracking of various sized optical disks by using varying tracking error signal sizes according to a capacity of the optical disk.

2. Description of the Related Art

An optical disk such as a Compact Disk (CD), and a Digital Video Disk (DVD) has a spiral track. An optical disk apparatus for reading the information recorded on the optical disk emits light onto the optical disk, and controls precise tracking for a pick-up part receiving light reflected from a recorded surface in order to detect data without errors. The tracking is controlled based on tracking error signals calculated according to high-frequency data read by the pick-up part.

FIG. 1 is a flow chart illustrating a conventional method for providing tracking for an optical disk apparatus.

Referring to FIG. 1, if an optical disk is inserted at step S10, a focus servo driving part is driven which controls the focusing of the pick-up part for reading data by placing a laser beam onto the optical disk at step S20. Then, a tracking error value is calculated without driving a tracking servo part for controlling the pick-up part to precisely track at step S30. The tracking servo driving part is adjusted to optimize tracking error signals based on the calculated tracking error signals at step S40, to compensate for the tilting of an optical disk during pick up. A sled servo driving part is driven which directly moves the tracking servo driving part and the pick-up part based on the calculated tracking errors at step S50. The sled servo driving part is not actually driven in the step of S50, but driven if comparatively there is a large change in track distance. If the pick-up part locates on the optical disk where data to be read is located via the above process, the gain of the tracking servo loop is adjusted at step S60, and the optical disk is reproduced at step S70.

The driving of the tracking servo driving part according to a conventional tracking error signal size is operated by firmware programmed based on a general optical disk having a storage capacity of 650 Mb. However, the capacity of optical recording apparatus has recently increased, and storage capacities of 700 Mb, 800 Mb and 870 Mb are now being provided. As such, if an optical disk having a capacity greater than 650 Mb is tracked by use of firmware programmed using a 650 Mb standard, the error distance varies based on the storage capacity of the media used. In general, the optical disk apparatus is driven a longer distance than it should because it's using a 650 Mb standard. In other words, the servo overshoots because the tracks are closer together than expected. Therefore, it takes the optical disk apparatus a longer time to track, which may result in the wrong operation being performed.

SUMMARY OF THE INVENTION

Accordingly, there is a need for an apparatus and method for tracking thereof which can optimize the tracking of various sized optical disks by using varying tracking error signal sizes according to a capacity of the optical disk.

The present invention has been developed in order to solve the above drawbacks and problems associated with the conventional arrangement and to provide other advantages. An aspect of the present invention is to provide a tracking method for an optical disk apparatus capable of optimizing the tracing of a track corresponding to each of optical disks having various storage capacities, in view of differences in tracking error signal sizes.

According to an aspect of the present invention, there is provided an optical disk apparatus having a pick-up part for emitting a light onto a recording surface of an optical disk and receiving the light reflected from the recording surface of the optical disk and a driving part for controlling the pick-up part. The optical disk apparatus comprises an error detection part for detecting a tracking error based on a distribution of the received and reflected light, when the pick-up part traces vertical movement of the optical-disk according to the control of the driving part; a capacity calculation part for calculating a capacity of an optical-disk corresponding to the calculated tracking error size; and a tracking control part for resetting a control method of the driving part for the pick-up part to trace a track of the optical-disk based on the calculated capacity.

The driving part further comprises a focus servo driving part for controlling the pick-up part in order to trace the vertical movement of the optical disk; a tracking servo driving part for controlling the pick-up part in order to trace the track of the optical disk; and a sled servo driving part for directly moving the pick-up part to trace the track of the optical recording medium, and the tracking control part for resetting the control method of the tracking servo driving part and the sled servo driving part.

The tracking control part resets the control method of the driving part based on the varying track intervals according to the capacity of the optical disk. When a certain modification signal is input for modifying the traced track, the tracking control part controls the driving part for the pick-up part in order to trace the track corresponding to the certain modification signal based on the reset control method of the driving part.

According to an aspect of the present invention, there is provided a tracking method of an optical disk apparatus having a pick-up part for emitting a light onto a recording surface of an optical disk and receiving the light reflected from the recording surface of the optical disk and a driving part for controlling the pick-up part. The tracking method comprises controlling the driving part for the pick-up part in order to trace the vertical movement of the optical disk; calculating a tracking error based on distribution extents of the received and reflected light; predicting the optical disk capacity corresponding to the calculated tracking error size; resetting the control method of the driving part for the pick-up part in order to trace the track of the optical disk based on the predicted capacity; and driving the driving part by the reset control method.

Resetting the control method of the driving part is performed based on the varying track intervals according to the optical disk capacity.

The method according to an embodiment of the present invention further comprises receiving a certain modification signal to the tracing track; and when the certain modification signal is input, controlling the driving part for the pick-up part to trace a track corresponding to the certain modification signal based on the reset control method of the driving part.

BRIEF DESCRIPTION OF THE DRAWINGS

The above aspects and features of the present invention will be more apparent by describing certain embodiments of the present invention with reference to the accompanying drawings, in which.

Throughout the drawings, it should be noted that the same or similar elements are denoted by like reference numerals.

DETAILED DESCRIPTION OF THE EXEMPLARY EMBODIMENTS

Figure 1:
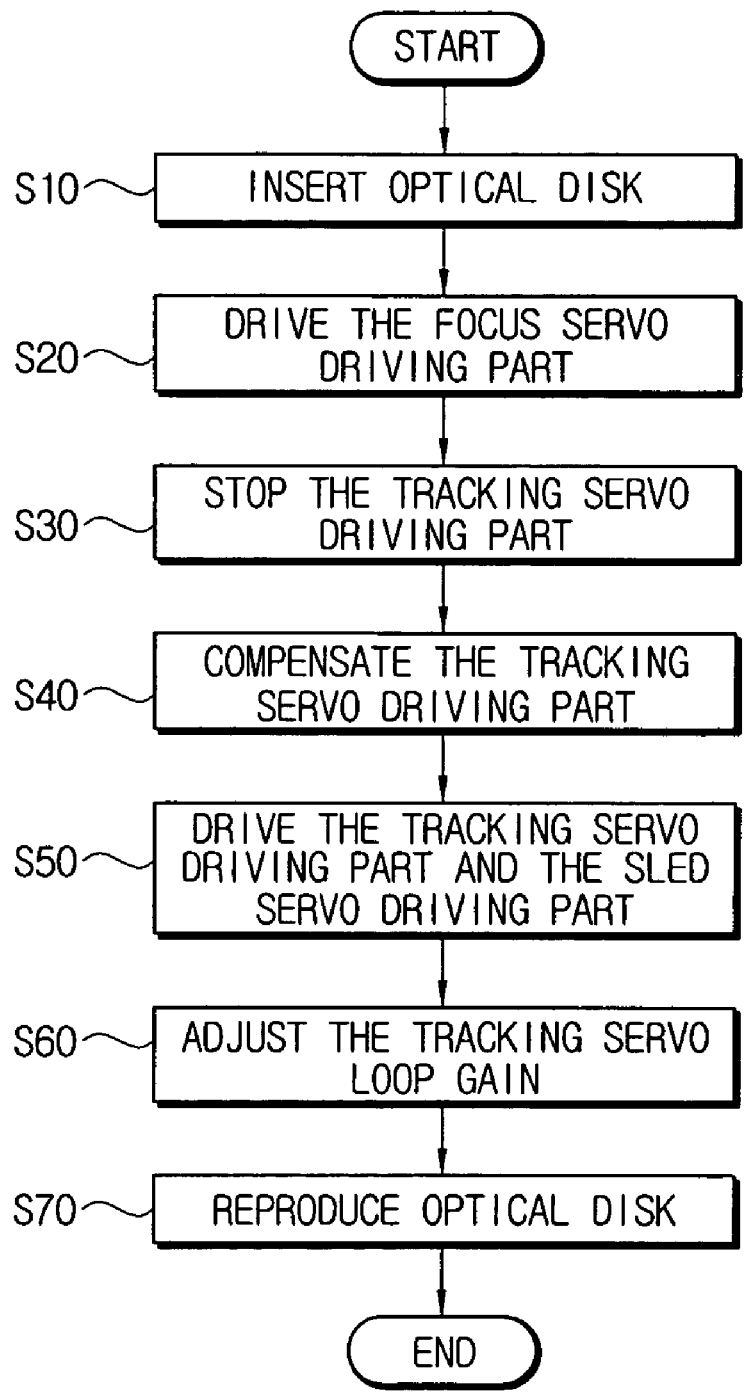
FIG. 1 is a flow chart illustrating a conventional method for tracking an optical disk apparatus.

Certain embodiments of the present invention will now be described in greater detail with reference to the accompanying drawings.

In the following description, the same drawing reference numerals are used for the same elements. The matters defined in the description such as a detailed construction and elements are exemplary and are provided to assist in a comprehensive understanding of the invention. Thus, it should be apparent that the present invention is not limited to the specific examples shown. Also, well-known functions or constructions are not described in detail for conciseness.

Figure 2:
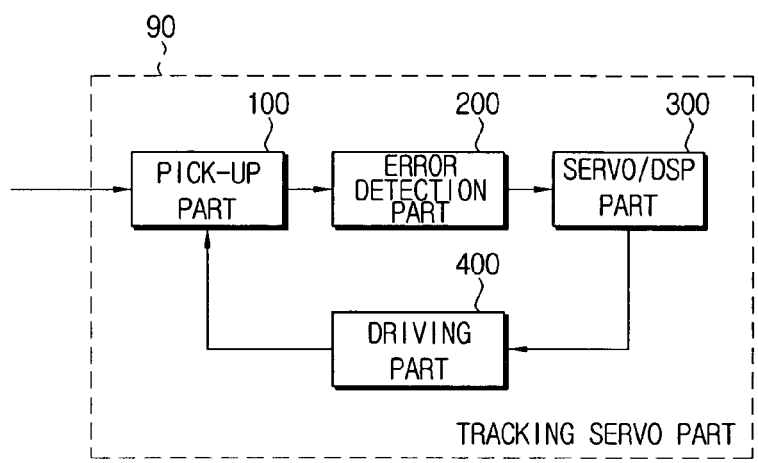
FIG. 2 is a block diagram of a tracking servo part of an optical disk apparatus according to an embodiment of the present invention.

FIG. 2 is a block diagram of a tracking servo part of an optical disk apparatus according to an embodiment of the present invention. Referring to FIG. 2, the tracking servo part 90 comprises a pick-up part 100, an error detection part 200, a servo/Digital Signal Processing (DSP) part 300 and a driving part 400.

The pick-up part 100 emits light onto a recording surface of an optical disk and receives the light reflected from the recording surface in order to read data from the optical disk. The error detection part 200 receives high-frequency data read by the pick-up part 100 and calculates tracking errors based on the extent of distribution of the reflected light. The servo/DSP part 300 calculates the total storage capacity of the optical disk upon the loading of the disk based on the size of the tracking error value. A driving part control signal is transmitted which controls the tracking servo driving part (not shown) and the sled servo driving part (not shown) based on the calculated capacity. The driving part 400 comprises the sled servo driving part, the tracking servo driving part and the focus servo driving part (not shown), and controls the sled servo driving part and the tracking servo driving part corresponding to the driving part control signal transmitted from the servo/DSP part 300 such that the pick-up part 100 can precisely trace a track.

Figure 3:
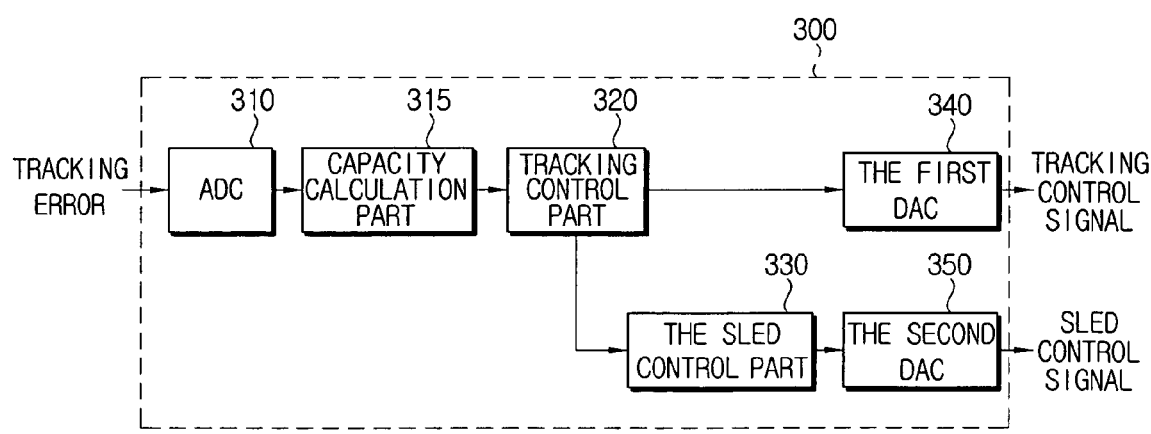
FIG. 3 is a detailed block diagram of the servo/Digital Signal Processing (DSP) part of FIG. 2.

FIG. 3 is a detailed block diagram of the servo/DSP part 300 of FIG. 2. Referring to FIG. 3, the servo/DSP part 300 comprises an analog to digital converter (ADC) 310, a capacity calculation part 315, a tracking control part 320, a sled control part 330, a first digital to analog converter (DAC) 340 and a second DAC 350.

The ADC 310 converts a tracking error into a digital signal. The capacity calculation part 315 calculates the capacity of an optical disk upon loading of the disk based on the converted tracking error signal size. The tracking error signal size may be predetermined via an experiment and recorded according to the storage capacity of the disk, and the tracking error signal calculated from the error detection part 200 may be mapped to the tracking error signal according to the predetermined capacity value such that the capacity of the loaded optical disk can be known.

The tracking control part 320 calculates the extent of movement of the tracking servo driving part based on optical disk capacity calculated from the capacity calculation part 315. The sled control part 330 calculates the extent the sled servo driving part was driven based on the calculated optical disk capacity. If the movement of the track is large, the tracking control part 320 controls the sled control part 330.

The first DAC 340 and the second DAC 350 output a tracking control signal and a sled control signal, which are digitalized by values output from each of the tracking control part 320 and the sled control part 330, to the driving part 400, and the driving part 400 controls the tracking servo driving part and the sled servo driving part based on the received tracking control signal and sled control signal such that the pick-up part 100 can precisely trace a track.

Figure 4:
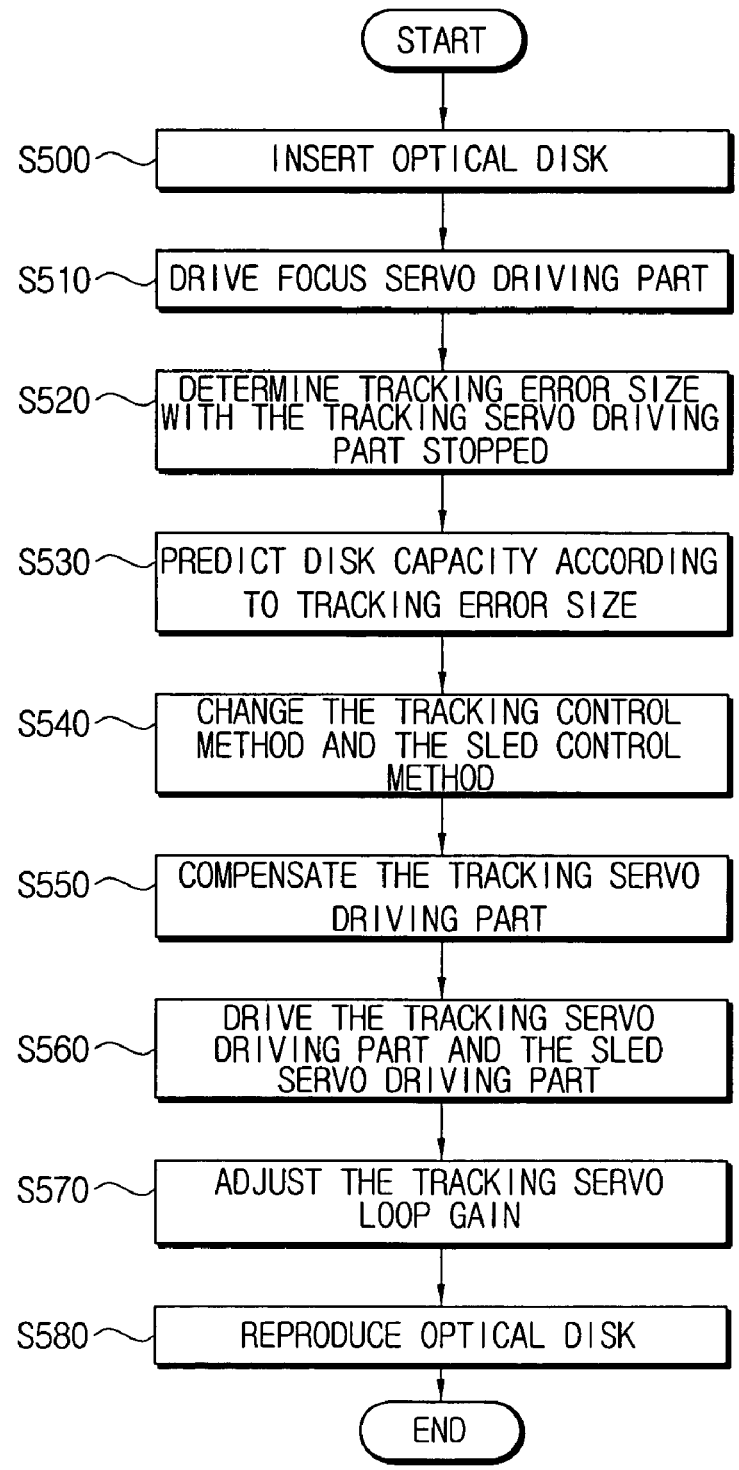
FIG. 4 is a flow chart illustrating a method for searching a track for an optical disk apparatus according to an embodiment of the present invention.

FIG. 4 is a flow chart illustrating a method of tracking for an optical disk apparatus according to an embodiment of the present invention. Referring to FIGS. 3 and 4, if an optical disk is inserted at step S500, the focus servo driving part is driven and the pick-up part 100 is vertically moved e.g., up and down, to track the optical disk turning and moving up and down at step S510.

Figure 5A:
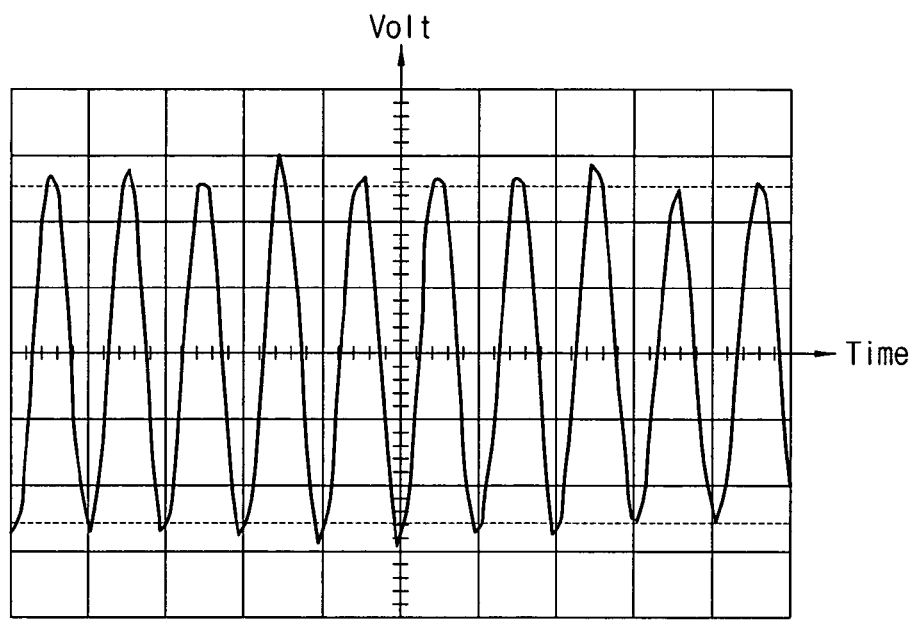
FIGS. 5A to 5B are views for comparing sizes of tracking errors according to optical disk capacity.
Figure 5B:
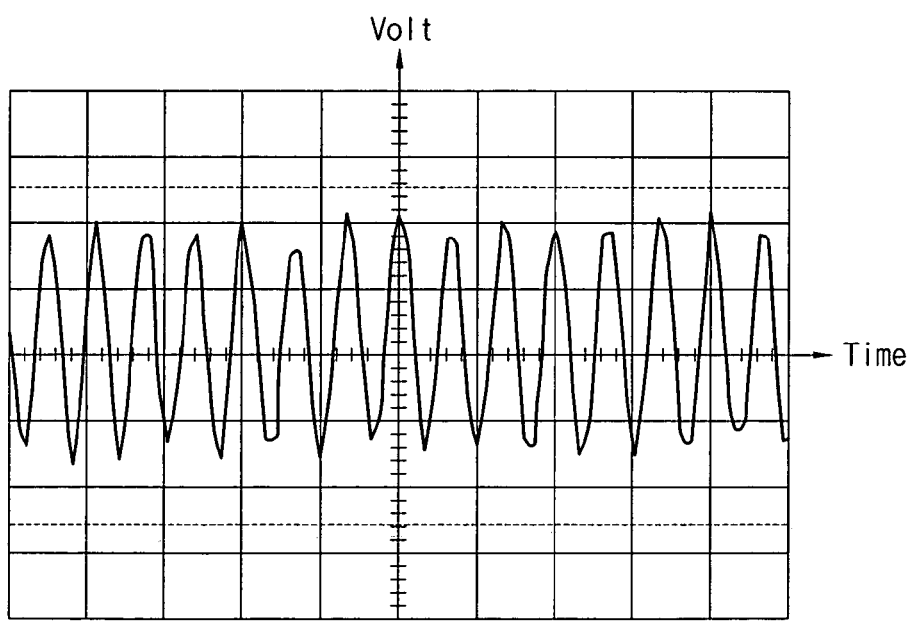
Figure 6:
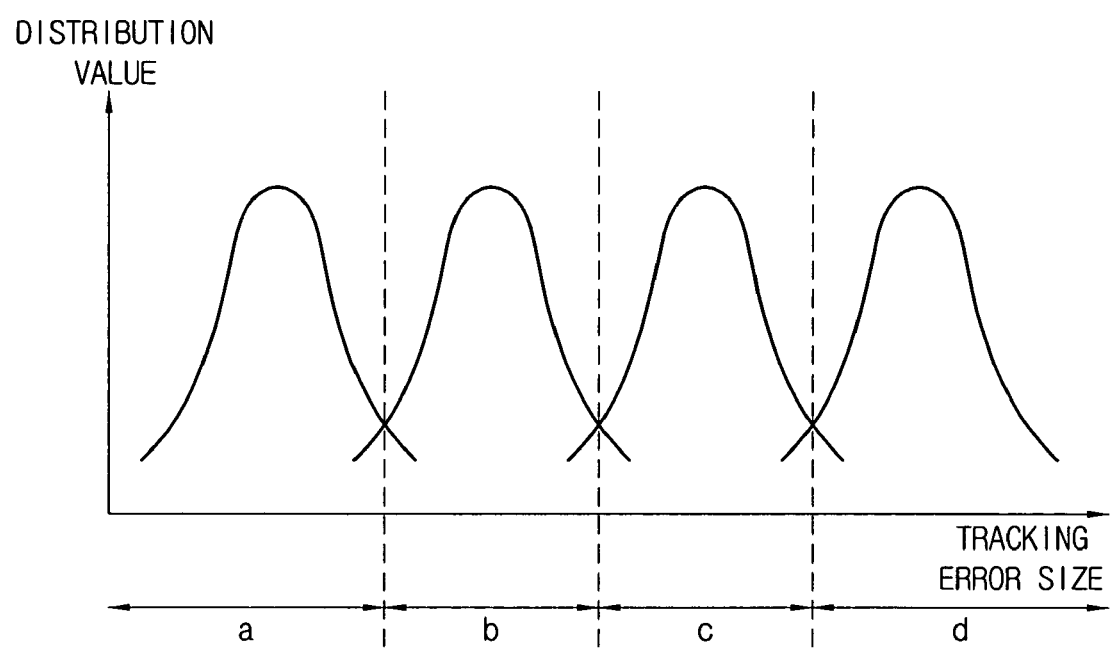
FIG. 6 is a distribution chart of sizes of tracking error signals according to optical disk capacity.

The tracking error size is determined with the tracking servo driving part stopped and the focus servo driving part driven at step S520. The disk capacity is predicted based on the calculated tracking error size at step S530. FIGS. 5A and 5B are views of calculated tracking error signals of each of optical disks of 650 Mb and 870 Mb, respectively. As shown in FIGS. 5A and 5B, as the capacity of the optical disk increases, the track gaps become smaller, and a tracking error value decreases such that the optical disk capacity can be predicted by use of the tracking error signal. Tracking error signals of optical disk having the same storage capacities may be predetermined via an experiment to calculate the values, and the tracking error signal predicted from the step of S530 is compared with the experimental value such that the optical disk capacity is calculated. FIG. 6 is an example of a distribution chart for tracking error sizes according to an optical disk capacity, which can be obtained experimentally. Referring to FIG. 6, the region "a" having a small tracking error size shows an optical disk having a relatively large storage capacity, and the region "d" having a large tracking error size shows an optical disk having a relatively small storage capacity. For example, regions a, b, c and d can show 870 Mb, 800 Mb, 700 Mb and 650 Mb, respectively. If the tracking error size calculated from the step of S530 is in the region c, the loaded optical disk can be 700 Mb.

Tracking and sled control methods are changed based on the calculated optical disk capacity at step S540. As an optical disk's storage capacity increases, the tracking servo driving part and the sled servo driving part control the pick-up part 100 to drive less than the driving distance of a conventional optical-disk of 650 Mb. The driving distance of pick-up part 100 can be calculated based on a track pitch according to each disk capacity.

The phenomenon of the optical disk and pick-up inclining to one side is compensated for based on the tracking error signal at step S550. The tracking servo driving part and the sled servo driving part are controlled by the changed control method at step S560. The gain of tracking servo part 90 is adjusted at step S570, and the optical disk is reproduced at step S580.

The sled servo driving part is not generally driven in the step of S560, and if a track to be traced is far from a tracing track, the tracking control part 320 controls the sled control part 330 to operate the sled servo driving part. If the track to be traced is changed by a user' control or a certain command, the track is traced by the changed tracking control method and sled control method.

According to the above methods, optimized tracking can be provided with regard to each optical recording medium having various capacity at an optical disk apparatus.

In conventional art, an optical disk capacity is set as one and then a track is searched based on the set optical disk capacity, whereas, according to an embodiment of the present invention, each optical disk capacity is calculated and then an optimized tracking method is provided such that the number of times retracking needs to be performed is reduced. As such, the tracking time is reduced, and wrong-operations due to mistracking may be prevented.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An optical disk apparatus having a pick-up part for emitting a light onto a recording surface of an optical disk and receiving the light reflected from the recording surface of the optical disk and a driving part for controlling the pick-up part, comprising:
    an error detection part for detecting a tracking error based on a distribution of the received and reflected light, when the pick-up part traces vertical movement of the optical-disk according to the control of the driving part;
    a capacity calculation part for calculating a capacity of an optical-disk corresponding to the calculated tracking error size; and
    a tracking control part for resetting a control method of the driving part for the pick-up part in order to trace a track of the optical-disk based on the calculated storage capacity of the optical-disk.

2. The apparatus as claimed in claim 1, wherein the driving part comprises:
    a focus servo driving part for controlling the pick-up part for tracing the vertical movement of the optical disk;
    a tracking servo driving part for controlling the pick-up part for tracing the track of the optical disk; and
    a sled servo driving part for directly moving the pick-up part for tracing the track of the optical disk,
    and the tracking control part for resetting the control method of the tracking servo driving part and the sled servo driving part.

3. The apparatus as claimed in claim 1, wherein the tracking control part resets the control method of the driving part based on the varying track intervals according to the capacity of the optical disk.

4. The apparatus as claimed in claim 1, wherein, when a modification signal is input for modifying the traced track, the tracking control part controls the driving part in order for the pick-up part to trace the track corresponding to the modification signal.

5. The apparatus as claimed in claim 1, wherein the capacity calculation part and the tracking control part comprise a servo/digital signal processing (DSP) part.

6. The apparatus as claimed in claim 5, wherein the servo/DSP part further comprises:
    an analog to digital converter (ADC) for converting an analog tracking error signal into a digital tracking error signal;
    a sled control part for calculating the extent the sled servo driving part is driven;
    a first digital to analog converter (DAC) for converting a digital tracking control signal into an analog tracking control signal; and
    a second DAC for converting a digital sled control signal into an analog sled control signal.

7. The apparatus as claimed in claim 6, wherein the driving part controls a tracking servo driving part and the sled driving part based on the analog tracking control signal and the analog sled control signal.

8. The apparatus as claimed in claim 1, wherein the calculated tracking error is compared to a predetermined tracking error.

9. The apparatus as claimed in claim 8, wherein the predetermined tracking error is correlated to media having predetermined storage capacities.

10. The apparatus as claimed in claim 1, wherein the optical-disk capacity can comprise one of 600 Mb, 650 Mb, 700 Mb, 800 Mb and 870 Mb.

11. A tracking method of an optical disk apparatus having a pick-up part for emitting a light onto a recording surface of an optical disk and receiving the light reflected from the recording surface of the optical disk and a driving part for controlling the pick-up part, comprising:
    controlling the driving part in order for the pick-up part to trace a vertical movement of the optical disk;
    calculating a tracking error based on an extent of distribution of the received and reflected light;
    predicting the optical disk capacity corresponding to the calculated tracking error size;
    resetting the control method of the driving part in order for the pick-up part to trace the track of the optical disk based on the predicted capacity; and
    driving the driving part by the reset control method.

12. The method as claimed in claim 11, wherein resetting the control method of the driving part is performed based on the varying track intervals according to the optical disk capacity.

13. The method as claimed in claim 11, further comprising:
    receiving a modification signal onto the tracing track; and
    controlling the driving part in order for the pick-up part to trace a track corresponding to the modification signal based on the reset control method of the driving part when the modification signal is input.

* * * * *